Apr. 10, 1923.
W. H. KITTO, JR., ET AL
1,451,097
GEAR CUTTING MACHINE
Filed Mar. 29, 1920  2 sheets-sheet 2
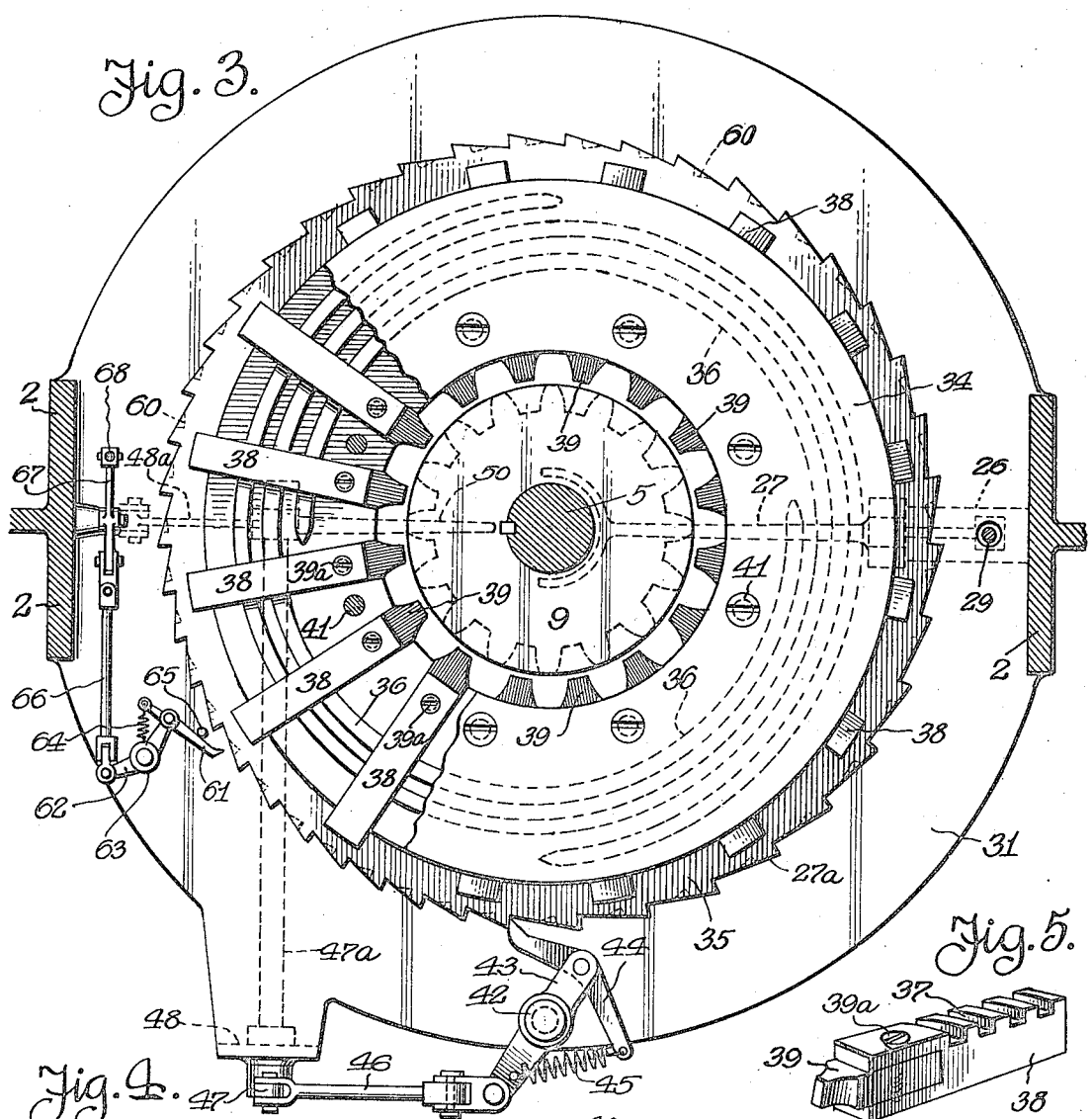
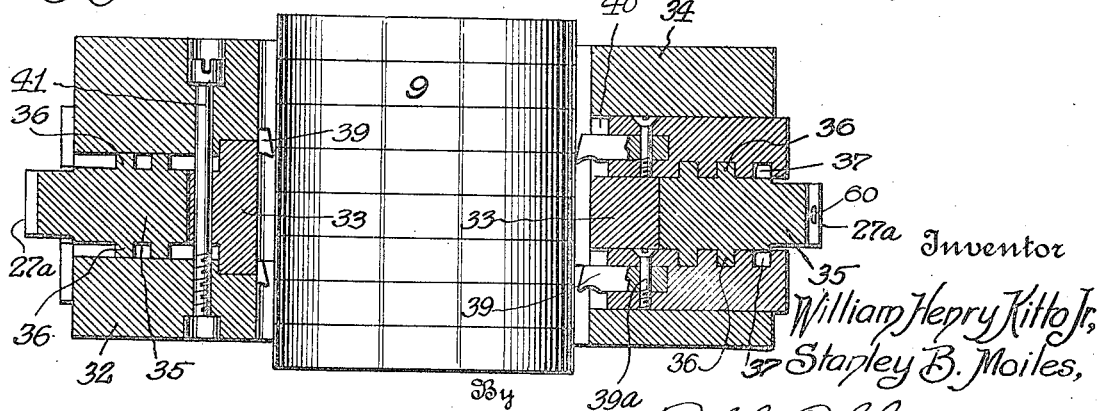

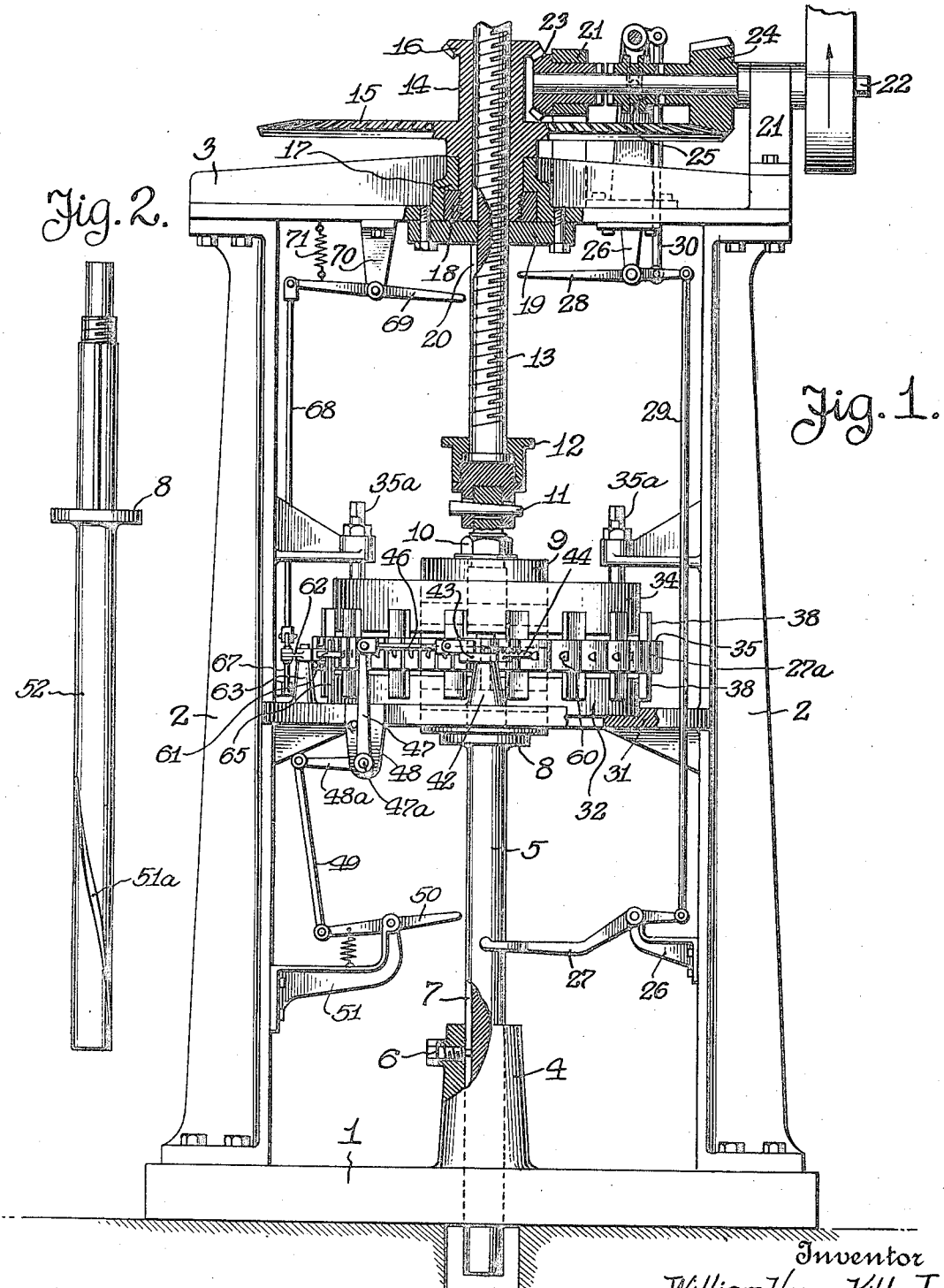

Patented Apr. 10, 1923.

1,451,097

UNITED STATES PATENT OFFICE.

WILLIAM HENRY KITTO, JR., AND STANLEY B. MOILES, OF DETROIT, MICHIGAN; SAID KITTO ASSIGNOR TO SAID MOILES.

GEAR-CUTTING MACHINE.

Application filed March 29, 1920. Serial No. 369,454.

*To all whom it may concern:*

Be it known that we, (*a*) WILLIAM HENRY KITTO, Jr., a subject of the King of Great Britain, and (*b*) STANLEY B. MOILES, a citizen of the United States of America, residing at Detroit, in the county of Wayne and State of Michigan, have invented certain new and useful Improvements in Gear-Cutting Machines, of which the following is a specification, reference being had therein to the accompanying drawings.

This invention relates to a gear cutting machine, and has special reference to a machine that may be employed for producing grooves, teeth, keyways or irregular surfaces in a multiplicity of blanks assembled and moved so that a multiplicity of cutters may simultaneously operate on the blanks.

The primary object of our invention is to provide a cutting machine for accurately, economically and expeditiously producing gears or similar toothed wheels, the machine embodying a multiplicity of circumferentially disposed cutters adapted to be intermittently adjusted, and novel means is employed for moving blanks or stock axially of the cutters so that each cutter may operate on the blanks or stock. Provision is made for slowly moving the blanks or stock during a cutting or work stroke and the same means is utilized for producing a fast reverse or non-work stroke, and in this manner operations may be rapidly carried on by the machine.

A further object of our invention is to provide a machine of the above type constructed somewhat on the lines of a vertical planer or broach machine wherein a reciprocatory work holder is controlled by a variable speed-automatic change-clutch control mechanism, and associated with the reciprocable work holder is a stationary multitool holder which has tools adapted to be intermittently adjusted and the speed of adjustment decreased towards the completion of a piece of work.

The above and other objects are attained by a mechanical construction that will be hereinafter considered and then claimed, and reference will now be had to the drawings, wherein—

Figure 1 is a side elevation of a machine, partly broken away and partly in section, embodying mechanism for carrying our invention into practice;

Fig. 2 is a side elevation of an auxiliary work holding spindle;

Fig. 3 is an enlarged horizontal sectional view of the machine showing a multi-tool holder; and its adjusting mechanism;

Fig. 4 is a vertical cross sectional view of the same; and

Fig. 5 is a perspective view of the detached tool.

A machine for carrying our invention into practice may embody a base 1, opposed uprights 2, and a cross head 3 constituting a vertically disposed framework.

The base 1 has a guide 4 for a work holding spindle 5 which is slidable in the guide 4 and prevented from turning therein by a screw 6 extending into a groove 7 in the spindle. Adjacent to the upper end of the spindle is an annular support or flange 8 which permits of a plurality of superposed blanks or pieces of stock 9 being supported thereon, the blanks in this instance being in the form of flat rings or apertured disks which are to have the peripheries thereof operated upon to convert the blanks or pieces of stock into gear wheels. The superposed blanks are retained on the support 8 by a nut 10 or other clamping means located on the upper end of the spindle 5, and said spindle is detachably connected, as at 11, to a head 12 on a screwthreaded spindle 13 which extends through the cross head 3 and is adapted to be raised and lowered relative thereto. The spindle 13 is in screwthreaded engagement with the hub 14 of a large beveled gear wheel 15 and a small beveled gear wheel 16, the hub 14 serving as a nut for feeding the spindle 13, and said hub is journaled in a bearing 17 of the cross head 3 and prevented from becoming accidentally displaced by a retaining ring 18.

Rotation of the spindle 13 is prevented by a member 19 connected to the cross head 3 and extending into a longitudinal groove 20 in said spindle, and it is now apparent that when the hub is rotated that the spindle 13 is raised and lowered and carries with it the work holder spindle 5.

On the cross head 3 are bearings 21 for a driven shaft 22 that may be operated by a motor or from any suitable source of power. The driven shaft 22 has a high speed beveled gear wheel 23, and a low speed beveled gear wheel 24, these gear wheels meshing with the gear wheels 16 and 15 respectively. The gear wheels 23 and 24 are loose on the shaft 22 and are adapted to be fixed relative thereto by a conventional form of clutch 25 interposed between said beveled gear wheels. The clutch 25 is automatically controlled by reciprocation of the work holder, and this is accomplished by arranging an acuating mechanism in the path of the work holder. The mechanism includes brackets 26 supporting pivoted levers 27 and 28 in the path of the work holder, the lever 27 being adjacent to the guide 4 to be actuated near the end of the non-work stroke of the work holder, and the lever 28 adjacent the cross head 3 to be actuated at the end or near the end of the work stroke of the work holder. The levers 27 and 28 are connected by a reach rod 29 and the lever 28 is connected by a link 30 a suitable bell crank to the clutch 25, so that the lever 27 will actuate the clutch 25 and fix the slow speed gear wheel 24 on the shaft 22, and thus permit of the work holder being raised at a slow speed for a cutting or work stroke. After the work holder has been raised the head 12 impinges against the lever 28, and the clutch 25 is shifted to fix the beveled gear wheel 23 relative to the shaft 22, so that there will be a comparatively fast speed imparted to the work holder for the reverse or non-work stroke thereof.

The uprights 2 are provided with an annular support 31 for a multi-tool holder composed of superposed members 32, 33 and 34 retained in such relation by clamps 35ª carried by the uprights 2. The members 32, 33 and 34 are best shown in Fig. 4 and each member is in the form of a flat ring or annulus, so that the work holder may move axially of the tool holder. The member 33 of the tool holder is of less diameter than the members 32 and 34 so that it may be surrounded by an index or tool adjusting member 35 having its periphery provided with ratchet teeth 27ª that vary in size or pitch, for a purpose that will hereinafter appear. The tool adjusting member 35 has its upper and lower faces provided with facially disposed spiral teeth 36 that extend into grooves 37 in tool sockets 38, said tool sockets having detachable and interchangable tools 39 held in correct positions by screws 39ª and by sides of tools engaging the walls of ways 40. The tool sockets 38 are radially disposed, as best shown in Fig. 3 and are slidable in radially disposed ways 40 provided therefor in the confronting faces of the members 32 and 34, said members being connected by a plurality of tie rods or screw bolts 41.

The tools 34 may be cutters of a conventional form positioned so that the upper set of cutters will perform work or duties slightly different from the lower set of cutters. For instance, the upper set of cutters may produce the depth of a groove while the lower set of cutters produces the width of the groove. This however, is not an important detail and neither is the use of two sets of tools, as the multi-tool holder 70 may be designed to simply hold one set of tools. In either instance, however, the tools are intermittently shifted by the tool adjusting member 35, when said member is actuated, and as an instance of actuating mechanism, we show the support 31 provided with a post 42. On the post is a rock arm 43 having one end provided with a pivoted pawl 44 normally engaging the ratchet teeth 27ª and the opposite end of said pawl is connected by a coiled retractile spring 45 to the arm 43 so that the pawl will be constantly held in engagement with the tool adjusting member 35. The arm 43 is connected by a link 46 to a crank 47 and a rock shaft 47ª journaled in a depending bracket 48 of the support 31, and said rock shaft having a crank 48ª connected by a link 49 to a lever 50 pivoted on a bracket 51, carried by one of the uprights 2. The lever 50 extends into the path of the work holder and is slightly above the plane of the lever 27 so that the lever 50 will be the first to be acuated on the down fast speed stroke of the work holder. In other words, just before the speed of the work holder is changed and its direction of movement reversed, the tool adjusting member 35 is actuated to set all of the tools for fresh cuts in the periphery of the superposed blanks or stock. When first placing the machine in operation the member 35 is rotated until the pawl 44 engages in the longest or largest ratchet tooth 27ª and assuming that the tool adjusting member 35 is rotated clockwise, considering Fig. 3, it will be noted that the adjustment of the tools gradually decreases until the work is performed. It is therefore possible to quickly perform outside or accessible cuts where no difficulty may be experienced in removing material, but as the removal of material becomes more difficult the adjustment of the tools decreases so that there will be less material removed during the final operations of the machine.

As thus far described, the cutters or tools produce vertical or equally parallel grooves, kerfs or recesses and when it is desired to produce wheels or members having spiral or angular teeth, grooves etc., the lower spindle 5 of the work holder may be provided with a spiral groove 51ª as shown in the auxiliary spindle 52, Fig. 2. The screw or pin 6 of the guide 4 will engage in the groove 51ª and partially rotate the work holder when it is reciprocated, and it is this partial rotation during cutting operations of the tools 39 that will cause spiral angular teeth or grooves, etc., to be produced on or in the peripheries of the superposed blanks on the work holder.

To slightly withdraw the cutters or tools during a fast downward movement of the work holder, so that there will be no danger of the cutters or tools bearing against pieces of work, we provide a mechanism in connection with the tool adjusting member so that the cutters or tools will be slightly withdrawn before the work holder starts on its downward movement. The mechanism is as follows:

The outer adjusting member has its periphery provided with small auxiliary ratchet teeth 60, said teeth being formed in the faces of the large ratchet teeth 27$^a$, and adapted to engage these auxiliary ratchet teeth and turn the member 35 in a counterclockwise direction, is a pivoted pawl 61 carried by a bell crank 62 pivoted on a post 63 on the annular support 31. The pawl 61 is connected to the post 63 by a coiled retractile spring 64 which holds the pivoted pawl 61 against a stop 65 on the support 31, so that the auxiliary pawl is normally out of engagement with the auxiliary ratchet teeth, but when the bell crank 62 is actuated the auxiliary pawl 61 engages the auxiliary ratchet teeth and shifts the member 35.

The bell crank 62 is connected by a rod 66 to a vertically disposed bell crank 67 supported by one of the uprights 2, and the bell crank 67 is connected by a rod 68 to a lever 69 pivoted on a bracket 70, carried by the cross head 3. The lever 69 is connected by a coiled retractile spring 71 to the cross head 3, and said lever extends into the path of the head 12 so that said lever will be actuated in advance of the lever 28.

It is now apparent that as the work holder completes a slow upward speed stroke it causes an adjustment of the member 35 to retract the cutters or tools, whereby the workholder can make a fast down speed stroke without any danger of the cutters or tools being injured.

If possible, we do not care to confine our invention to a vertical or horizontal machine, to the mechanism for reciprocating the work holder or controlling its speeds, nor to the mechanism employed for automatically and intermittently adjusting the tools of the machine. We also reserve the right to make any changes as are permissible by the appended claims.

What we claim is:—

1. Means for operating on the periphery of a blank or blanks, consisting of a reciprocatory holder for a blank or superposed blanks, circumferentially disposed cutters about said holder, means for moving said reciprocatory holder at different speeds so that said blanks are carried into engagement with said cutters, means at one side of said holder controlling the speeds of said reciprocatory holder, and means at the opposite side of said holder controlled by movement of said holder for advancing and retracting said cutters.

2. Means as characterized in claim 1, wherein said holder moving means includes a screw, constantly meshing gears, and a clutch controlling the operative relation of said gears.

3. Means for simultaneously operating on a plurality of pieces of work comprising a multiplicity of tools, work supporting means, means for moving said work supporting means back and forth for work and non-work strokes between said tools so that the work is operated on during the work stroke, and means in the path of the work supporting means for changing the speed at which the work is moved after each work and non-work stroke.

4. Means as characterized in claim 3, wherein the tools are automatically retracted for a non-work stroke and advanced at the end of each non-work stroke.

5. A multi-blank cutting machine comprising a work holder having a slow speed work stroke and a fast speed non-work stroke, a multiplicity of tools in the path of the work holder during a slow speed work stroke, thereof, and means for advancing said tools for fresh cuts during a fast speed non-work stroke of said work holder.

6. A cutting machine as characterized in claim 5, wherein the tools are circumferentially disposed about the work holder and the tool advancing means gradually decreases the adjustment of the tools towards completion of the cutting operations.

7. The combination of a work holder, slow raising and fast lowering means for said work holder, an adjustable tool normally stationary and past which the work holder is moved, means actuated during a fast lowering movement of said work holder for retracting said tool, and means actuated during a fast lowering movement by said work holder to place said slow raising means in operation.

8. The combination of a work holder, adjustable tools, a variable speed, automatic change and clutch controlled mechanism for reciprocating said work holder so that said work holder has a slow work stroke and a fast non-work stroke relative to said tools, means actuated near the end of the slow work stroke for adjusting said tools, means actuated near the end of the work stroke to operate the clutch of the reciprocating mechanism and change the slow work stroke to a fast non work stroke, and means actuated near the end of the fast non work stroke to change the movement of said work holder to a slow speed work stroke.

9. A multi-tool holder comprising superposed members, radially disposed tool sockets between said members, a tool adjusting member between said members and adapted to simultaneously adjust said tool sockets, means for moving said tool adjusting member, and means for moving a piece of work into engagement with said tools.

10. A multi-tool holder comprising annular members, superposed and radially disposed sets of tools slidable in said members, means between the sets of superposed tools for simultaneously adjusting said sets of tools, and means for moving a piece of work through said annular members to be operated on by said tools.

11. An external gear cutting machine comprising adjustable cutters, a reciprocable work holder having work and non-work strokes relative to said cutters, clutch controlled means for reciprocating said work holder, means in the path of said work holder, for actuating said clutch controlled means to effect a change of the stroke of said work holder, a ratchet mechanism actuated prior to a change from a work stroke to a non-work stroke of the work holder to cause retraction of said cutters, and a ratchet mechanism actuated at the beginning of each work stroke to cause an advance of said cutters.

12. An external gear cutting machine as in claim 11 wherein the last mentioned ratchet mechanism causes a progressive increase in the adjustment of the cutters on each work stroke of the work holder.

In testimony whereof we affix our signatures in presence of two witnesses.

WILLIAM HENRY KITTO, JR.
STANLEY B. MOILES.

Witnesses:
ANNA M. DORR,
KARL H. BUTLER.